United States Patent
Bois

(10) Patent No.: US 8,763,521 B2
(45) Date of Patent: Jul. 1, 2014

(54) FOOD MOISTURIZER APPARATUS AND METHOD

(76) Inventor: David Bois, Kansas City, MO (US)

(*) Notice: Subject to any disclaimer, the term of this patent is extended or adjusted under 35 U.S.C. 154(b) by 422 days.

(21) Appl. No.: 12/685,234

(22) Filed: Jan. 11, 2010

(65) Prior Publication Data

US 2010/0175566 A1    Jul. 15, 2010

Related U.S. Application Data

(60) Provisional application No. 61/143,675, filed on Jan. 9, 2009.

(51) Int. Cl.
*A47J 37/00*    (2006.01)

(52) U.S. Cl.
USPC .............................. 99/467; 99/483; 126/369

(58) Field of Classification Search
USPC .......... 99/467, 468, 470, 476, 483; 126/21 A, 126/369; 219/401
See application file for complete search history.

(56) References Cited

U.S. PATENT DOCUMENTS

| | | | | |
|---|---|---|---|---|
| 1,005,166 A | * | 10/1911 | Crombie | 219/436 |
| 2,148,143 A | * | 2/1939 | Waitzman | 426/234 |
| 2,515,641 A | * | 7/1950 | Ellsworth et al. | 219/436 |
| 2,737,881 A | * | 3/1956 | Turner | 99/339 |
| 2,980,099 A | | 4/1961 | Klemm | |
| 3,805,018 A | * | 4/1974 | Luong et al. | 219/387 |
| 3,868,941 A | | 3/1975 | Roderick | |
| 4,194,109 A | * | 3/1980 | Springer | 219/386 |
| 5,191,831 A | * | 3/1993 | Walden | 99/446 |
| 5,274,215 A | * | 12/1993 | Jackson | 219/439 |
| 5,363,748 A | * | 11/1994 | Boehm et al. | 99/372 |
| 5,365,038 A | * | 11/1994 | Mitsugu | 219/386 |
| 5,501,142 A | * | 3/1996 | Bailey | 99/482 |
| 5,771,789 A | | 6/1998 | Davis | |
| 7,053,338 B1 | * | 5/2006 | Tesfagaber | 219/438 |
| 2007/0137499 A1 | * | 6/2007 | Leon et al. | 99/422 |

OTHER PUBLICATIONS

International Preliminary Report on Patentability for PCT/US2010/020630, dated Jul. 12, 2011, 5 pages.

* cited by examiner

*Primary Examiner* — William Pierce

(74) *Attorney, Agent, or Firm* — Shook, Hardy & Bacon L.L.P.

(57) ABSTRACT

An apparatus and method that maintains an optional heated environment in addition to a humid environment in an interior thereof such that one or more edible items may be stored therein with properties of the one or more edible items maintained in a desirable state.

20 Claims, 2 Drawing Sheets

US 8,763,521 B2

FOOD MOISTURIZER APPARATUS AND METHOD

CROSS-REFERENCE TO RELATED APPLICATIONS

This application claims priority to U.S. Provisional Patent Application Ser. No. 61/143,675, filed Jan. 9, 2009, the disclosure of which is incorporated herein by reference in its entirety.

BACKGROUND OF THE INVENTION

1. Field of the invention

The present invention generally relates to an apparatus and method to store one or more edible items, and more particularly, to an apparatus and method that maintains a humid environment in an interior of the apparatus such that the one or more edible items may be stored therein with properties of the edible item, such as moisture and temperature, maintained in a desirable state.

2. Description of the Related Art

Currently available traditional devices are manufactured by Nestle™ and Pillsbury™. One type of traditional device may be found in commercial locations, such as airports and convenience stores, and maintains cellophane-packaged edible items, such as cookies, in a large, two-tiered warmer. The cellophane is provided in addition to the actual device itself and acts to retain any moisture in the edible items in attempt to prevent undesirable intense dryness of the edible items.

This type of traditional device is problematic at least for the reason that it is especially inconvenient for a consumer to attempt to maintain edible items in cellophane or sealable plastic bags. The consumer must have the forethought to purchase and have the cellophane or sealable plastic bags available, and then must individually wrap and seal each of the edible items in attempt to reproduce the environment necessary to maintain a preferred state of the edible item.

This type of traditional device is additionally problematic when attempting to use it in a noncommercial environment such as a home. While the device may be made smaller, the intense heat generated by the device in attempt to keep the edible items warm, causes the edible items to dry out sooner. Consequently, the traditional device is inappropriate for non-commercial and limited to high-use, commercial applications.

Accordingly, there is a demand being for an apparatus and method for moisturizing food that maintains and/or increases a warmth and/or moisture of edible items, such as cookies, without requiring cellophane, sealable plastic bags, or other wraps, and is appropriate for high and/or low usage applications and prevents drying out of edible items.

Moreover, there is also a demand for a heating apparatus and method for increasing and/or maintaining warmth and moisture of edible items, the apparatus and method being easy to use, economically priced, and non-obstructively sized and shaped for ideal use on a home counter.

SUMMARY OF THE INVENTION

The present general inventive concept provides an apparatus and method that maintains a humid environment in an interior thereof such that one or more edible items may be stored therein with properties of the one or more edible items maintained in a desirable state.

The present general inventive concept also provides an apparatus and method that maintains an optional heated environment in addition to a humid environment in an interior thereof such that one or more edible items may be stored therein with properties of the one or more edible items maintained in a desirable state.

The foregoing and/or other aspects and advantages of the present general inventive concept may be achieved by providing an apparatus with a water tray that combines three functions: serving, optional warming, and storage such that an edible item may be enclosed therein and heated in a humid environment via a water element and a heat element to maintain or improve moistness of edible items, such as bakery-type goods, placed within the present general inventive concept.

The foregoing and/or other aspects and advantages of the present general inventive concept may further be achieved by providing an apparatus with an ability to serve warm edible items, such as cookies, on a counter out of an enclosed server for extended periods such that a user is not required to continually warm cookies in an oven or microwave to achieve the same results, but can dry out the cookies, which is prevented by the present general inventive concept.

The foregoing and/or other aspects and advantages of the present general inventive concept may further be achieved by providing an apparatus that can display edible items under clear acrylic where the edge of the clear acrylic meets a ceramic or stoneware surface on an aluminum, heat-diffusing tray and forms a sealing gasket therebetween to keep food fresh. The present general inventive concept may also be used to keep rolls, pastries, biscuits, and the like for days or up to a week. Thus, if the user is not using the present general inventive concept to heat, they can simply store and display edible items within the present general inventive concept.

The foregoing and/or other aspects and advantages of the present general inventive concept may further be achieved by providing an apparatus having a heat-diffusing tray of a plurality of layers including a first lower metal layer, e.g., aluminum, to diffuse heat received from below the tray, and a second upper ceramic or stone layer to conduct, retain, and distribute heat received from the first lower metal layer so that bakery-type goods sitting on the second upper ceramic layer may be maintained at a desirable temperature such as 105 to 115 degrees Fahrenheit.

The foregoing and/or other aspects and advantages of the present general inventive concept may further be achieved by providing an apparatus that is heated by one electrical coil below a ceramic tray to diffuse heat underneath to provide a more uniform heating.

The foregoing and/or other aspects and advantages of the present general inventive concept may further be achieved by providing an apparatus with a concealed heating element to prevent contact of the heating element with the user or water contained within a water reservoir, thereby increasing the safety of the present general inventive concept.

The foregoing and/or other aspects and advantages of the present general inventive concept may further be achieved by providing an enclosed, vented air space that is heated to provide a heated environment of approximately 100-115 degrees Fahrenheit with a water climate to humidify the good.

The foregoing and/or other aspects and advantages of the present general inventive concept may further be achieved by providing a food-moisturizing apparatus including an enclosable space having (i) a lower support surface, (ii) side panels, and (iii) an upper removable panel that define the enclosable space, and a moisturizing element on the support surface to contain a substance therein having an evaporative characteristic such that the moisturizing element may increase moisture within the enclosable space of the apparatus.

The moisturizing element may be removable from the lower support surface and may be nestable on the lower support surface.

The moisturizing element may be securable on the lower support surface by a circumferential ridge.

The upper removable panel may be hinged to a rear panel.

The food-moisturizing apparatus may include a heating element located in another enclosable space beneath the enclosable space.

The lower support surface may include a tray with a removable heat diffusing element nested therein that diffuses heat received from the heating element.

The upper removable panel may include an exhaust vent to permit gas to escape from the enclosable space.

The heating element may include a controller to activate and deactivate the heating element and/or to permit a user to select one of a plurality of temperatures for operation of the heating element such as high heat, medium heat, and low heat, or a specific temperature within a temperature range.

The foregoing and/or other aspects and advantages of the present general inventive concept may further be achieved by providing a method of maintain food moisture in an apparatus, the method including providing an apparatus having an enclosable space defined by (i) a lower support surface, (ii) side panels, and (iii) an upper removable panel, and providing a moist environment in the enclosable space using a moisturizing element oriented on the support surface with a substance therein having an evaporative characteristic such that moisture of food placed within the enclosable space may be maintained.

Additional aspect and advantages of the present general inventive concept will be set forth in part in the description which follows and, in part, will be obvious from the description, or may be learned by practice of the general inventive concept.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE INVENTION

Reference will now be made in detail to the embodiments of the present general inventive concept. The embodiments are described below in order to explain the present general inventive concept. The present general inventive concept comprises a liner apparatus and method for faucets and the like.

The present general inventive concept generally comprises an apparatus 1 having a lower base element 10 and an upper lid element 30 to selectively completely enclose the apparatus 1.

Figure 1:
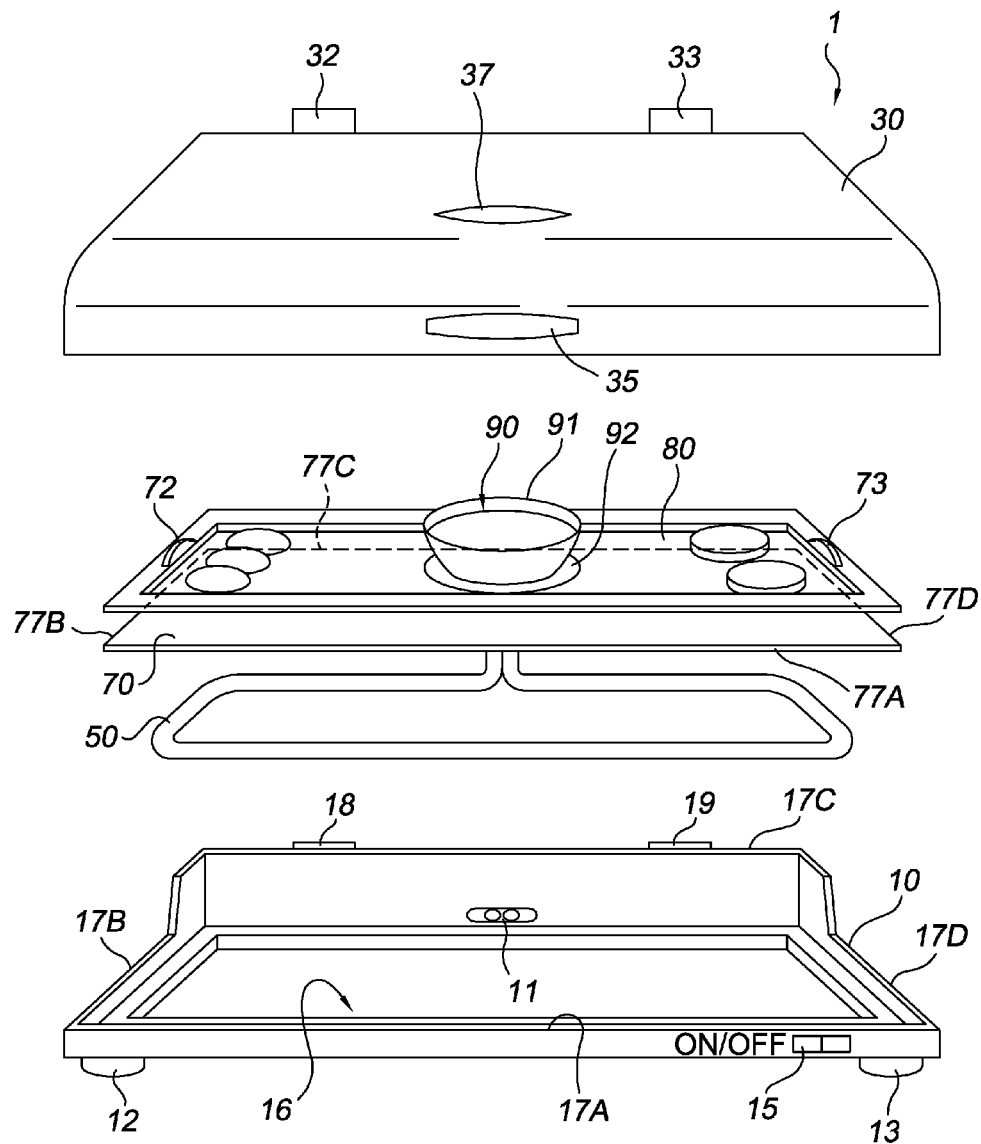
FIG. 1 illustrates a front elevational, exploded view of a food-moisturizing apparatus with a water tray warmed by a heat coil and a steam vent to exhaust steam produced from heated water.

The base element 10 is substantially flat with a plurality of legs 12 and 13. Although just two legs 12 and 13 are illustrated in FIG. 1, it is foreseen that the apparatus 1 may have at least three and preferable four legs, one at each of four corners of the apparatus 1.

Also contained on the base 10 is a power OFF/ON switch 15 to control power supplied to a heat coil 50. A standard temperature without such an adjustment setting is 100-115 degrees and preferably 105-115 degrees Fahrenheit. The power switch provides either AC or DC power to the apparatus 1.

It is foreseen that the power switch 15 may have a temperature adjustment setting such as high, medium, and/or low to enable a user to control the amount of power supplied to the heat coil 50, thereby controlling a temperature within an interior of the apparatus 1. A high, medium, and or low temperature is respectively 100, 107.5, and 115 degrees Fahrenheit.

In the exemplary embodiment, the heat coil 50 is a single coil that extends into and out of a rear wall of the base 10 via a plurality of apertures, i.e., two apertures 11, to form a substantially elongated "O" shape to facilitate even distribution of heat within the interior of the apparatus 1. The heat coil 50 is embedded into an inner cavity 16 of the base 10 such that a heat diffusing tray 70 may rest on and be supported by side walls 17A, 17B, 17C, and 17D of the base 10.

Specifically, the tray 70 has a plurality of edges 77A, 77B, 77C, and 77D that are sized and shaped to nest on upper edges of side walls 17A, 17B, 17C, and 17D to securely support the tray 70 nested on and partially or entirely within base 10.

Although the heat diffusing tray 70 is manufactured from aluminum in the preferred embodiment, it is foreseen that the tray 70 may be manufactured from a similar metal, plastic, or the like that enables heat to be diffused throughout an area of the tray 70.

The tray 70 supports a ceramic element 80 that nests on and either substantially or entirely within the tray 70. The ceramic element 80 has handles 72 and 73 situated on either side of the ceramic element 80.

A water reservoir device 90 is situated adjacent to the ceramic element 80 such that a round ceramic dish 91 may be positioned on top of the ceramic element 80.

The dish 91 to hold water abuts a raised area or ridge 92 molded in the ceramic element 80 situated around the dish 91 to securely hold the dish 91 in place. In the preferred embodiment, the dish 91 holds approximately 2-8 cups and preferably 5 cups of water and has an opening at a top of the dish 91 to facilitate refilling of the dish 91.

The water in the dish 91 is heated by the heat coil 90 to produce steam such that, when the lid 30 is closed, the interior of the apparatus 1 may be maintained as a humid environment for any items, such as cookies, cake, bread, and/or the like.

The water in the dish 91 must be refilled after a certain amount of time, such as every 24 hours, depending on the temperature setting of the heat coil 50.

It is foreseen that the dish 91 may be equipped with a sensor (not illustrated) to signal when the dish requires refilling of water, such as when a water level of the dish 91 reaches a certain level or when the dish 91 is completely empty. Such a signal could be a visual signal, such as a flashing/solid light on an exterior of the apparatus 1, such as on the lid 30 and/or adjacent to switch 15, or the signal may be an audible signal generated from an audible signal generation device. The apparatus 1 may be optional equipped with the light and/or audible signal together or separately.

Further, another indicator may be provided via the lid 30 of the present general inventive concept. Specifically, the lid 30 may be constructed from a transparent material, such as plastic, such that the user may observe a water level of the dish 91 by looking through the clear lid 30 to see whether all of the water has evaporated.

The preferred material for the ridge 92 is the same ceramic as the element 80 to enable the dish 91 to conduct heat and insulate the dish 91. This conduction and insulation allows the dish 91 to maintain a heated state for a longer period of time than would be possible if the dish 91 were not surrounded by and nested within ridge 92.

The placement of the water reservoir device 90 at the back of the element 80 is preferable such that the dish 91 may be refilled easily and does not obstruct any items on the element 80 that are being stored thereon.

In another embodiment, a water element (not illustrated) may be provided instead of the water reservoir device 90. The water element may be a drawer in a back wall of apparatus 1, such as in wall 17C, that may be pulled out from an open grid above to serve as a humidity element. This would be an option if the surface was plastic rather than ceramic (perhaps for a second, cheaper product option). Both would be positioned away from any coil underneath.

The lid 30 encloses the tray 80 of the apparatus 1 and is attached to rear wall 17C of the tray 80 by hinges 32 and 33, which engage hinge attachment elements 18 and 19 located on the rear wall of 17C.

The hinges 32 and 33 enable the lid 30 to be opened or closed via handle 35.

Centrally located on the lid 30 is an exhaust vent 37 to allow steam to escape from the apparatus 1, prevent water condensation, and facilitate circulation of air within the apparatus 1. It is foreseen that the exhaust vent 37 may be selectively opened or closed to selectively permit steam to escape from the apparatus or be contained therein such that a user may create an ideal environment within the apparatus.

Figure 2:
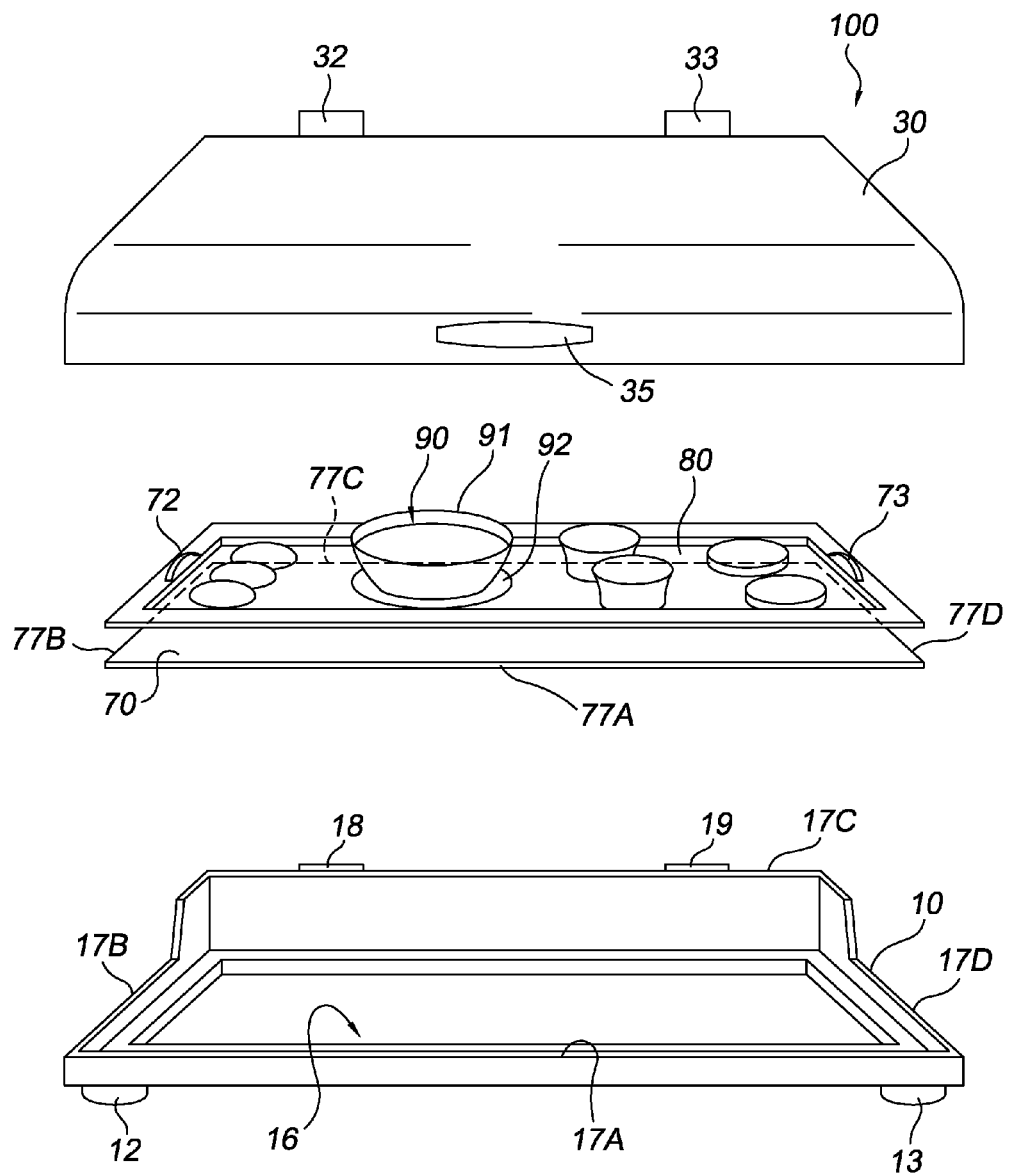
FIG. 2 illustrates a front elevational, exploded view of a food-moisturizing apparatus with a water tray without a heat coil and a steam vent.

FIG. 2 illustrates another embodiment, apparatus 100 without a heat element and heat-related features such as an exhaust vent and power switch.

Similar to apparatus 1, apparatus 100 functions to keep edible items moist and prevent drying out using water reservoir device 90 to contain water. However, instead of heating coil 50 of apparatus 1, apparatus 100 functions using room temperature, which is approximately 72 degrees Fahrenheit. The room temperature causes water to evaporate, albeit at a slower rate of evaporation relative to heated apparatus 1, and increase moisture within the apparatus 100 thereby maintaining moisture of edible items stored in apparatus 100.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A food-moisturizing apparatus comprising:
    a base element comprising one or more side walls that define an inner cavity, the one or more side walls forming a ledge to receive a heat defusing tray;
    a heat defusing tray disposed on the ledge of the base element and forming a top for the inner cavity;
    an electrical heating element attached to the base element and located within the inner cavity and beneath the heat defusing tray;
    a removable food warming surface disposed on the heat defusing tray;
    a lid resting on the base element, wherein the base element and the lid, when in a closed position, define an enclosable space above the removable food warming surface;
    a controller for the electrical heating element set to heat the food warming surface to a temperature between 100 and 115 degrees Fahrenheit; and
    a moisturizing element configured to hold a liquid, the moisturizing element located on the removable food warming surface within the enclosable space and positioned to allow the liquid to evaporate into the enclosed space.

2. The food-moisturizing apparatus according to claim 1, wherein the moisturizing element is removable from the food warming surface and nests on the food warming surface, the moisturizing element securable on the food warming surface by a circumferential ridge.

3. The food-moisturizing apparatus according to claim 1, wherein the moisturizing element is a drawer.

4. The food-moisturizing apparatus according to claim 1, further comprising a level sensor to signal when a water level in the moisturizing element reaches a threshold level.

5. The food-moisturizing apparatus according to claim 2, wherein the circumferential ridge is located toward a rear of the removable food warming surface.

6. The food-moisturizing apparatus according to claim 1, wherein the lid includes an exhaust vent to permit gas to escape from the enclosable space.

7. The food-moisturizing apparatus according to claim 1, wherein the controller provides a plurality of selectable temperatures for operation of the heating element.

8. A method of maintain food moisture in an apparatus, the method comprising:
    setting out an apparatus having a lid resting on to a base element that supports a food warming surface that is above an electrical heating element having a controller set to heat the food warming surface to a temperature between 100 and 115 degrees Fahrenheit, wherein the base element and the lid, when in a closed position, define an enclosable space above the food warming surface, which is a oriented to display a previously cooked food;
    adding water to a moisturizing element oriented on the food warming surface to maintain moisture of the previously cooked food placed within the enclosable space; and
    placing the previously cooked food on the food warming surface.

9. The method of claim 8, further comprising setting the controller to one of a high, a medium, or a low setting.

10. The method of claim 9, wherein the low setting is 100 degrees Fahrenheit, the medium setting is 107.5 degrees Fahrenheit, and the high setting is 115 degrees Fahrenheit.

11. The method of claim 10, further comprising removing the moisturizing element from the enclosed space.

12. A food-moisturizing apparatus comprising:
    a base element comprising one or more side walls that define an inner cavity, the one or more side walls forming a ledge to receive a heat defusing tray;
    an electrical heating element attached to the base element and located within the inner cavity and beneath the heat defusing tray;
    a removable food warming surface disposed above the inner cavity;
    a lid resting on the base element, wherein the base element and the lid, when in a closed position, define an enclosable space above the removable food warming surface;

a controller for the electrical heating element set to heat the food warming surface to a temperature between 100 and 115 degrees Fahrenheit;

a removable moisturizing element configured to hold a liquid, the moisturizing element located within into the enclosed space; and a level sensor to signal when a water level in the moisturizing element reaches a threshold level.

13. The food-moisturizing apparatus according to claim 12, wherein the removable moisturizing element nests on the food warming surface.

14. The food-moisturizing apparatus according to claim 12, wherein the removable moisturizing element is positioned in a compartment within the body that is below the food warming surface.

15. The food-moisturizing apparatus according to claim 14, wherein the food warming surface comprises an opening to connect the compartment with the enclosed space.

16. The food-moisturizing apparatus according to claim 12, wherein the removable food warming surface comprises handles.

17. The food-moisturizing apparatus according to claim 16, wherein the moisturizing element rests on the tray.

18. The food-moisturizing apparatus according to claim 16, wherein the tray is ceramic.

19. The food-moisturizing apparatus according to claim 12, wherein the moisturizing element is ceramic.

20. The food-moisturizing apparatus according to claim 12, wherein the lid is transparent.

\* \* \* \* \*